United States Patent [19]

DeLue et al.

[11] Patent Number: 4,636,286
[45] Date of Patent: Jan. 13, 1987

[54] ELECTRO ORGANIC METHOD

[75] Inventors: Norman R. DeLue, Akron; Stanley R. Pickens, Wadsworth, both of Ohio

[73] Assignee: PPG Industries, Inc., Pittsburgh, Pa.

[21] Appl. No.: 478,928

[22] Filed: Mar. 25, 1983

[51] Int. Cl.[4] ............................................. C25C 1/00
[52] U.S. Cl. ............................................. 204/59 R
[58] Field of Search ................................. 204/72–80, 204/59 R

[56] References Cited

U.S. PATENT DOCUMENTS

| | | | |
|---|---|---|---|
| 2,130,813 | 9/1938 | Ohman | 204/80 |
| 3,316,163 | 4/1967 | Oser | 204/129 |
| 3,342,717 | 9/1967 | LeDuc et al. | 204/265 |
| 3,427,234 | 2/1969 | Guthke et al. | 204/73 A |
| 3,501,388 | 3/1970 | Kronig et al. | 204/79 |
| 3,551,207 | 12/1970 | Herbst | 429/14 |
| 3,616,320 | 10/1971 | Beck et al. | 204/73 A |
| 3,616,321 | 10/1971 | Verheyden et al. | 204/73 A |
| 3,723,264 | 3/1973 | LeDuc et al. | 204/80 |
| 3,884,776 | 5/1975 | Keidel et al. | 204/73 R |
| 3,907,652 | 9/1975 | Wagenknecht et al. | 204/79 |
| 4,212,714 | 7/1980 | Coker et al. | 204/98 |
| 4,214,958 | 7/1980 | Coker et al. | 204/98 |
| 4,276,146 | 6/1981 | Coker et al. | 204/266 |

FOREIGN PATENT DOCUMENTS 1104092 6/1981 Canada .
1105874 7/1981 Canada .
56-23290 3/1981 Japan .

OTHER PUBLICATIONS

Beck, F. and Guthke, H., "Entwicklung Neuer Zellen fur Elektro-Organische Synthesen", *Chemie Ingenieur Technik*, 41 (17), 943–950 (1969) (original and translation).

Fitzjohn, J. L., "Electro-Organic Synthesis", *Chemical Engineering Progress*, 71(2), 85–91 (1975).

Ogumi, Z. et al, "Application of the SPE Method to Organic Electrochemistry-II. Electrochemical Hydrogenation of Olefinic Double Bonds", *Electrochimica Acta*, 26(12), 1779–1782 (1981).

Pletcher, D., "Organic Electrosynthesis in the Fine Chemicals Industry", *Chemistry and Industry*, Jun. 5, 1982.

*Primary Examiner*—John F. Niebling
*Attorney, Agent, or Firm*—Bruce H. Cottrell; Mark Levin; Richard M. Goldman

[57] ABSTRACT

Discloses a solid electrolyte containing entrapped, mobile, ion transport means, which may either divide an electrolytic cell into two compartments or be immersed in a single electrolyte.

5 Claims, 3 Drawing Figures

ELECTRO ORGANIC METHOD

DESCRIPTION OF THE INVENTION

Electrolytic synthesis of organic compounds in an electrolytic cell has generally proven to be industrially unsatisfactory. This is because of the necessity of providing a current carrier, i.e., an ionizable molecule, to carry charge between the anode and the cathode. The organic reactants and products themselves generally will not perform this function because of their lack of ionic character.

One attempt at eliminating the requirement for a dissolved, ionized, or liquid current carrying supporting electrolyte is disclosed in U.S. Pat. No. 3,427,234 to Guthke et al. and Japanese Patent 56/23290 to Yoshizawa et al., both of which describe the use of a solid polymer electrolyte electrolytic cell to carry out the electrolytic synthesis of organic compounds. In a solid polymer electrolyte electrolytic cell the anode is in contact with one surface of the solid polymer electrolyte, and the cathode is in contact with the other surface of the solid polymer electrolyte. The solid polymer electrolyte itself is a polymeric material having pendant ionic groups which enhance the ionic conductivity of the underlying polymer matrix. Thus, negatively charged particles may flow from the cathode through the solid polymer electrolyte to the anode, without ever contacting the organic media or positively charged particles may travel from the anode through the solid polymer electrolyte to the cathode, likewise without ever contacting the organic media. In the solid polymer electrolyte as described in Guthke et al. and Yoshizawa et al., the cathodic reaction takes place at an electrode-liquid organic reactant interface, a surface of the cathode being in contact with the solid polymer electrolyte. The anodic reaction takes place at an electrode-liquid organic reactant interface, a surface of the anode being in contact with the solid polymer electrolyte. Charged particles traverse the solid polymer electrolyte as described hereinabove.

However, the provision of a solid polymer electrolyte in contact with both the anode and the cathode, does not, alone, provide an industrially useful electrolytic cell for electroorganic synthesis. For example, the typical prior art permionic membrane materials, such as DuPont NAFION ®described, for example, in U.S. Pat. Nos. 3,041,317 to Gibbs, 3,718,617 to Grot, and 3,849,243 to Grot, the Asahi Glass Company, Ltd. permionic membrane described, e.g., in U.S. Pat. Nos. 4,065,366 to Oda et al., 4,116,888 to Ukihashi et al. and 4,126,588 to Ukihashi et al., and the Asahi Chemical Company permionic membrane materials, described in U.S. Pat. No. 4,151,053 to Seko et al., require water of hydration. The combination of water of hydration and immobilized ionic sites, bonded to the polymer, provide ionic conductivity through the permionic membrane. In the absence of water of hydration, the electrical resistivity of the permionic membrane and more particularly, the resistance to ionic transport of the permionic membrane, is objectionably higher. As organic media are typically non-aqueous, the aforementioned permionic membranes when employed in such organic media are unable to attain or maintain an equilibrium content of water of hydration. Similarly, where the reaction medium is an aqueous gas phase medium, the reactants and products also being anhydrous gases, the aforementioned permionic membrane materials are incapable of maintaining an equilibrium water of hydration content.

Therefore, means must be provided within the permionic membrane to provide continuing ionic mobility in the presence of anhydrous reactants and products, including gaseous organic reactants and products. As herein described, ionic mobility may be provided by providing ionic means within the solid polymer electrolyte structure itself. Exemplary ionic means within the solid electrolyte structure include, e.g., entrapped but mobile ionic means as a strong electrolyte, the presence of an aqueous electrolyte in a solid polymer electrolyte structure having hydrophobic boundaries whereby to maintain the aqueous electrolyte therein, or the presence of polar, ionic organic moieties within the permionic membrane or solid electrolyte with means either for preventing their escaping therefrom or for retaining them therein.

Moreover, when such means are provided within the solid electrolyte, e.g., the solid polymer electrolyte, electroorganic or other non-aqueous reactions may be carried out in either a divided cell, i.e., a cell where the solid electrolyte, solid polymer electrolyte, or permionic membrane divides the cell into anolyte and catholyte compartments, or in electrolytic cells where the reaction medium, i.e., the reactants, products, and any other materials are present in one unitary medium, containing both the anode and the cathode. Thus, it is further herein contemplated to utilize a solid electrolyte, which may be a solid polymer electrolyte, in an electrolytic cell where the anode and cathode are in contact with essentially the same reaction medium, the external surfaces of the anode and cathode being in contact with the reaction medium, and other surfaces, e.g., the internal surfaces of the anode and cathode, being in contact with a solid electrolyte as a solid polymer electrolyte, or permionic membrane, or inorganic solid electrolyte. In this way, the reactions principally occur at a site on the cathode or anode which is not embedded in the solid electrolyte. That is, the reactions principally occur at the external surfaces of the respective electrodes, i.e., at the interfaces of the respective electrodes with the reaction medium, while ionic transport is through the solid electrolyte. The herein contemplated structure may be used with either liquid or gaseous reactants and products.

The solid electrolyte itself may be an inorganic material as a crystalline inorganic material, a solid polymer electrolyte, or a solid polymer electrolyte or inorganic material comprised of multiple zones having a highly ionizable current carrier therein.

The electrodes may be removably in contact with external surfaces of the solid electrolyte, bonded to external surfaces of the solid electrolyte, or bonded to and embedded in the solid electrolyte, the catalyst may independently be covalently bonded to reactive ligands which ligands are in contact with, bonded to, or reactive with the solid polymer electrolyte.

As herein contemplated the supporting electrolyte and polar solvents normally required in the prior art may be substantially reduced or even eliminated. This results in a product of higher purity, greater ease of separation, and fewer side reactions, and constant potential. Moreover, the invention herein contemplated permits greater choice in the selection of the organic solvent, without regard to the presence or absence of a supporting electrolyte.

FIGURES

DETAILED DESCRIPTION OF THE INVENTION

The invention herein contemplated resides in a method of electrolytically synthesizing organic compounds, and in solid electrolytes useful in the synthesis of organic compounds. More particularly, the invention relates to solid electrolyte electrolytic methods for the essentially anhydrous electrolytic synthesis of compounds, especially organic compounds.

According to one exemplification of the invention herein contemplated gas phase organic reactions may be carried out. Gas phase organic electrolytic reactions present special problems because of the absence of water of hydration, polarizable liquids, or ionic liquids. Thus, as herein contemplated, gas phase organic reactions may be carried out by reacting an organic reactant at an electrode of an anode-cathode electrode pair to form an organic product. The method herein contemplated comprises contacting one member of the electrode pair, i.e., the anode-cathode pair with the organic gaseous reactant while externally imposing an electrical potential across the electrode pair, the organic reactant and the organic product being gaseous, and both electrodes of the electrode pair being in contact with solid electrolyte means therebetween, e.g., as shown in FIGS. 1 through 3, inclusive.

More particularly, in distinction to fuel cell reactions, the contemplated reactions provide useful chemical products other than water or oxides of carbon. Moreover, the reactions contemplated herein require energy to be supplied to the system whereby to form the product, as by externally imposing an electrical potential across the anode and cathode.

Figure 1:
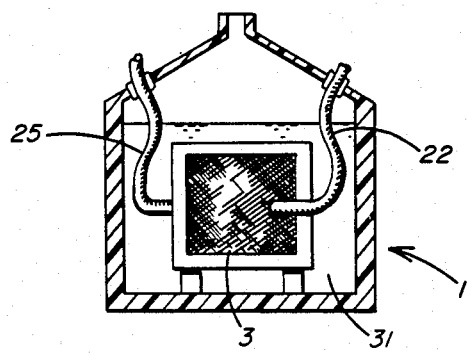
FIG. 1 is a cutaway front elevation of an electrolytic cell according to one exemplification of the invention herein contemplated.
Figure 2:
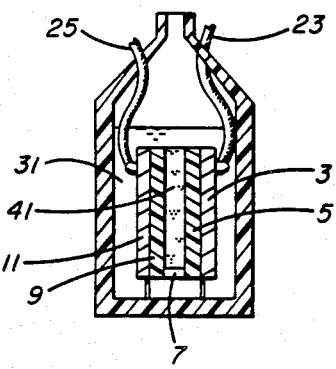
FIG. 2 is a cutaway side elevation of the electrolytic cell shown in FIG. 1.
Figure 3:
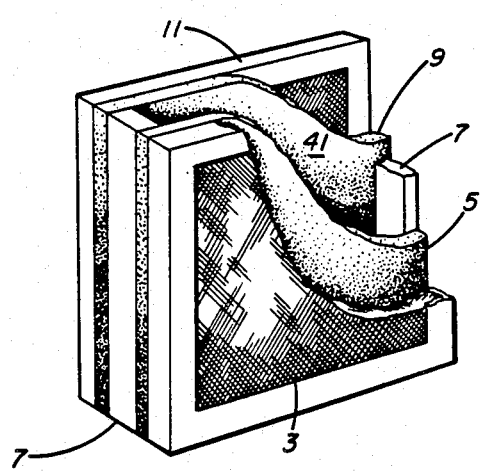
FIG. 3 is an isometric, partial cutaway, of the electrodesolid electrolyte-electrode assembly of the electrolytic cell shown in FIGS. 1 and 2.

An electrolytic cell structure for carrying out the method of this invention is shown in FIGS. 1, 2 and 3. As there shown, an electrolytic cell (1) has a structure of an anode (3), a solid electrolyte (5) in contact with the anode, a second solid electrolyte (9) in contact with the cathode (11), and a seal (7) between the two solid electrolyte portions (5) and (9). The structure of the anode side solid electrolyte portions (5), the cathode side of the solid electrolyte portion (9), and seal (7), contain a highly ionizable material whereby to provide ion transport between the anode and cathode. Also shown in FIGS. 1 and 2 is an anode contact (23), cathode contact (25), and a unitary reaction medium (31) of reagent and reactant which may be in contact with both the anode and cathode, or, the anode and cathode may be separated from each other by the solid electrolyte structure of solid electrolyte (5), seal (7), and solid electrolyte (9), with separate anolyte liquors and catholyte liquors. The ionizable current carrier (41) is between the two portions (5) and (9) of the solid electrolyte, the anode (3), and the cathode (11).

While the anode-solid electrolyte-cathode is shown in the figures as an assembly of planar elements, it may also be an assembly that is of an open construction, i.e., to allow the organic medium to flow through the anode-solid electrolyte-cathode structure.

In a further exemplification of the method of this invention, which may utilize the above-described structure, a gaseous phase reaction may be carried out at either the anode or the cathode or both, by contacting the appropriate electrode or electrodes with the gas phase reactant or reactants in forming gas phase product or products. By a gas phase reactant or product is meant a reactant or product that is gaseous at the temperatures and pressures within the electrolyte cell. For example, as described in the commonly assigned, copending application of N. R. DeLue for *Electro Organic Method And Apparatus For Carrying Out Same*, filed on even date herewith, an olefin may be oxidized at an anode by contacting the anode with the olefin, where the olefin is gaseous and the anode and cathode are both in contact with a solid electrolyte having ionic current carrying means incorporated therein. Typical olefins which may be oxidized this way include ethylene, propylene, butylene and the like, whereby to provide alcohols, glycols, aldehydes, acids, carbonates, alkyl oxides, and mixtures thereof. As herein contemplated, the solid electrolyte may be anion selective so that hydroxyl ion present at the cathode is transported to the anode, the hydroxyl ion then may participate in the oxidation of the olefin.

According to a further exemplification of the method of this invention as described in the commonly assigned, copending application of S. R. Pickens for *Electro Organic Method And Apparatus For Carrying Out Same*, filed on even date herewith, there is provided a method of producing a liquid or gaseous organic fluorocarbon compound at an anode of an anode-cathode pair by contacting the anode with an alkyl halide and hydrogen fluoride and externally imposing an electrical potential across the anode-cathode pair. It is contemplated herein that the anode and cathode are both in contact with the above-described solid electrolyte means and the hydrogen fluoride is a gas, e.g., an anhydrous gas.

According to a further exemplification of the method of this invention, also described in the commonly assigned, copending application of S. R. Pickens, organic sulfur compounds, e.g., chosen from the group consisting of sulfides, sulfoxides, and sulfonyls, may be electrolytically prepared in an electrolytic cell having an anode, a cathode, and the aforedescribed solid electrolyte means therebetween and in contact therewith. As herein contemplated, the organic sulfur compounds are formed by contacting either the cathode or the anode with a gaseous sulfur compound, e.g., $H_2S$, $SO_2$, $SO_3$, $SOCl_2$, $SO_2Cl$, or the like, and a gaseous or liquid organic compound. Exemplary organic compounds include olefins, e.g., $C_2$ to $C_8$ olefins, primary alcohols, e.g., $C_1$ to $C_6$ primary alcohols, secondary alcohols, e.g., $C_3$ to $C_6$ secondary alcohols, and tertiary alcohols, e.g., $C_4$ to $C_8$ tertiary alcohols. Additionally, organic halides, for example, primary and secondary alkyl and aryl chlorides, bromides and iodides may be reacted according to the method herein contemplated to form the organic sulfur compounds. Especially preferred organic reactants are $C_2$ to $C_6$ olefins, $C_1$ to $C_4$ primary alcohols, $C_3$ to $C_6$ secondary alcohols, $C_4$ to $C_8$ tertiary alcohols, and alkyl or aryl bromides and iodides having from 1 to 8 carbon atoms.

According to a still further exemplification of the method of this invention, described in the commonly assigned, copending application of M. Korach for *Elec-* tro Organic Method And Apparatus For Carrying Out Same, filed on even date herewith, the gas phase reactions may be carried out at a lower voltage and higher efficiency by providing packing means in contact with one of the anode and cathode, and feeding the gaseous organic reactant to the electrolytic cell at a velocity high enough to induce turbulence therein while externally imposing an electrical potential across the anode and cathode.

As described hereinabove, the solid electrolyte contains means for transporting ions therethrough. This is especially significant in processes involving non-aqueous media, such as organic media, where by non-aqueous is meant that the behavior of the media of reactant and/or product is substantially that of non-ionizable organic material, incapable of carry charge at industrially feasible voltages. That is, the reactant and product medium functions as an insulator or dielectric rather than as a conductor. By non-aqueous media is meant substantially or essentially anhydrous media. The non-aqueous medium is not necessarily electrolyzed. It may simply serve as a solvent or diluent for the product or reactant. In the method herein contemplated, utilizing the structure above-described, the reagent is electrolyzed at an electrode means, where the anode is in contact with one surface of the solid electrolyte means and the cathode is in contact with the opposite surface of the solid electrolyte means. As herein contemplated, the non-aqueous medium containing an organic reactant is provided in contact with one or both of the anode and cathode and an electrical potential is externally imposed across the anode and cathode so as to evolve product at an anode or a cathode or both and transport ionic species across the solid electrolyte means. As herein contemplated the solid electrolyte means comprises an entrapped ion transport medium, e.g., an entrapped immobilized ion transport medium or an entrapped mobile ion transport medium.

The structure of anode (3) solid electrolyte means (5), (7), (9), cathode (11), may divide the electrolytic cell into separate anolyte and catholyte compartments. When the cell is so divided, the anode is in contact with anode compartment reactant and product, and the cathode is in contact with cathode compartment reactant and product, the anode compartment medium and cathode compartment medium being capable of supporting different chemistries and conditions. Alternatively, the anode (3), solid electrolyte means (5), (7), (9), and cathode (11) may be in contact with the same non-aqueous medium, e.g., the structure may be porous or immersed in a single medium. As, for example, shown in FIGS. 1 and 2, the solid electrolyte means (5), (7), (9), provides electrical conductivity between the anode (3) and cathode (11), and the liquid (31) contains the reaction medium.

The solid electrolyte means (5), (7), (9), may include a hollow or laminated permionic membrane structure having an ionizable aqueous or non-aqueous liquid (41) therebetween. Thus, the solid electrolyte means may comprise two sheets (5), and (7) of ion-exchange resin material having a zone, volume, or layer (41) of ionic aqueous material therebetween. Additionally, one or both of the sheets (5), (9) of the ion-exchange resin material may have a hydrophobic layer, not shown, thereon, whereby to retain the ionic aqueous material within the structure of the permionic membrane sheets and ionizable current carrier compartment (41). Alternatively, the solid electrolyte means (5), (7), (9), may be a single sheet of permionic membrane material, containing a highly ionizable aqueous material therein, and having hydrophobic layers on the external surfaces thereof whereby to retain the ionic aqueous material within the solid electrolyte means.

Alternatively, the current carrier medium (41), may contain an oxidation and reduction resistant polarizable compound capable of solvating ions. Exemplary materials include glycols, glycol ethers, ammonium salts, crown ethers, alcohols, nitro compounds, carboxylic acids, esters, sulfoxides, and the like.

The permionic membrane interposed between the anode and the cathode may be formed of a polymeric fluorocarbon copolymer having immobile, cation selective ion exchange groups on a halocarbon backbone. The membrane may be from about 2 to about 25 mils thick, although thicker or thinner permionic membranes may be utilized. The permionic membrane may be a laminate of two or more membrane sheets. It may, additionally, have an internal reinforcing structure.

The functional group of the permionic membrane, A, may be a cation selective group. It may be a sulfonic group, a phosphoric group, a phosphonic group, a carboxylic group, or a reaction product thereof, e.g., an ester thereof. Thus, as herein contemplated, A in the structural formulas shown below is chosen from the group consisting of:
—COOH,
—COOR$_1$,
—COOM,
—COF,
—COCl,
—CN,
—CONR$_2$R$_3$
—SO$_3$H,
—SO$_3$M,
—SO$_2$F,
—SO$_2$Cl, and
—SO$_2$NH$_2$,
where R$_1$ is a C$_1$ to C$_{10}$ alkyl group, R$_2$ and R$_3$ are hydrogen or C$_1$ to C$_{10}$ alkyl groups, and M is an alkali metal or a quaternary ammonium group. According to a preferred exemplification, A is:
—COCl,
—COOH,
—COOR$_1$,
—SO$_2$F,
—SO$_2$Cl, or
—SO$_2$NH$_2$,
where R$_1$ is a C$_1$ to C$_5$ alkyl.

As herein contemplated, when a perfluorinated, cation selective permionic membrane is used, it is preferably a copolymer which may have:

(I) fluorovinyl ether acid moieties derived from

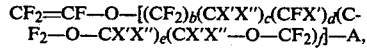

where b, c, d, e, and F are integers from 0 to 6, exemplified by

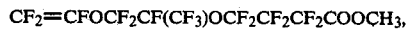

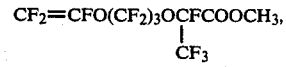

-continued $$CF_2=CFO(CF_2)_4OCFCOOCH_3,$$
$$|$$
$$CF_3$$

$$CF_2=CFOCF_2CFCF_2COOCH_3, \text{ and}$$
$$|$$
$$CF_3$$

$CF_2=CFOCF_2CF(CF_3)OCF(COOCH_3)CF_3$; inter alia:

(II) fluorovinyl moieties derived from $$CF_2=CF-(O)_a-(CFX')_d-A,$$

where a and d are integers from 0 to 6, exemplified by $CF_2=CF(CF_2)_{2-4}COOCH_3,$ $CF_2=CF(CF_2)_{2-4}COOC_2H_5,$ $CF_2=CF(CF_2)_{2-4}COOH,$ $CF_2=CFO(CF)_{2-4}COOCH_3,$ $CF_2=CF(CF_2)_{2-4}COOC_2H_5,$ and $CF_2=CFO(CF_2)_{2-4}COOH,$ inter alia;

(III) fluorinated olefin moieties derived from $$CF_2=CXX'$$

as exemplified by tetrafluoroethylene, dichlorodifluoroethylene, chlorotrifluoroethylene, hexafluoropropylene, trifluoroethylene, vinylidene fluoride and the like; and (IV) vinyl ethers derived from $$CF_2=CFOR_4$$

where R is a perfluoroalkyl group having from 1 to 6 carbon atoms.

The cation selective membrane need not be perfluorinated. Cation selective membranes may be made from resins prepared, for example, by the copolymerization of styrene, divinylbenzene and an unsaturated acid, ester, or anhydride, such as acrylic acid, methacrylic acid, methyl methacrylate, methyl acrylate, maleic anhydride, or the like. Other resins useful in forming cation selective membranes may be prepared, for example, from polymers or copolymers of unsaturated acids or their precursors, such as unsaturated acids or nitriles, or by the introduction of acid functional groups into crosslinked, non-perfluorinated polymers such as polyolefins, polyethers, polyamides, polyesters, polycarbonates, polyurethanes, polyethers, or poly(phenol formaldehydes) by means of reaction with a sulfonating, carboxylating, or phosphorylating reagent.

Alternatively, the ion exchange group A may be an anion selective group, such as a quaternary ammonium group, a secondary amine group, or a tertiary amine group. Exemplary anion selective permionic membranes include ammonium derivatives of styrene and styrene-divinyl benzene polymers, amine derivatives of styrene and styrene-divinyl benzene, condensation polymers of alkyl oxides, e.g., ethylene oxide or epichlorohydrin with amines or ammonia, ammoniated condensation products of phenol and formaldehyde, the ammono products of acrylic and methacrylic esters, iminodiacetate derivatives of styrene and styrene-divinylbenzene.

A useful permionic membrane herein contemplated has an ion exchange capacity of from about 0.5 to about 2.0 milliequivalents per gram of dry polymer, preferably from about 0.9 to about 1.8 milliequivalents per gram of dry polymer, and in a particularly preferred exemplification, from about 1.0 to about 1.6 milliequivalents per gram of dry polymer. A useful perfluorinated permionic membrane herein contemplated may have, in the ester form, a volumetric flow rate of 100 cubic millimeters per second at a temperature of 150 to 300 degrees Centigrade, and preferably at a temperature between 160 to 250 degrees Centigrade. The glass transition temperatures of such permionic membrane polymers are desirably below 70° C., and preferably below about 50° C.

The permionic membrane herein contemplated may be prepared by the methods described in U.S. Pat. No. 4,126,588, the disclosure of which is incorporated herein by reference.

Most commonly the ion exchange resins will be in a thermoplastic form, i.e., a carboxylic acid ester, e.g., a carboxylic acid ester of methyl, ethyl, propyl, isopropyl, or butyl alcohol, or a sulfonyl halide, e.g., sulfonyl chloride or sulfonyl fluoride, during fabrication, and can thereafter be hydrolyzed.

When the solid electrolyte is a solid polymer electrolyte composed of a hydrated polymeric gel, as described above, it is essential to provide or retain water of hydration therein. This may be accomplished by adding moisture, i.e., water vapor, to the gaseous reactant as described in the commonly assigned, copending application of M. Korach, referred to hereinabove. In this way the polymeric ion exchange resin membrane is maintained hydrated.

According to an alternative exemplification, the permionic membrane useful in carrying out this invention may have a porous, gas and liquid permeable, non-electrode layer bonded to either the anodic surface, or the cathodic surface, or both the anodic and cathodic surfaces thereof, as described in British Laid Open patent application 2,064,586 of Oda et al. As described by Oda et al., the porous, non-catalytic, gas and electrolyte permeable, non-electrode layer does not have a catalytic action for the electrode reaction, and does not act as an electrode.

The porous, non-electrode layer is formed of either a hydrophobic or a non-hydrophobic material, either organic or inorganic. As disclosed by Oda et al., the non-electrode material may be electrically non-conductive. That is, it may have an electrical resistivity above 0.1 ohm-centimeter, or even above 1 ohm-centimeter. Alternatively, the porous, non-electrode layer may be formed of an electrically conductive material having a higher overvoltage than the electrode material placed outside the porous, non-electrode layer, i.e., the porous, non-electrode layer may be formed of an electrically conductive material that is less electrocatalytic than the electrode material placed outside the porous, non-electrode layer.

The material in the porous, non-electrode layer is preferably a metal, metal oxide, metal hydroxide, metal nitride, metal carbide, or metal boride of a Group IVA metal, e.g., Si, Ge, Sn, or Pb, a Group IVB metal, e.g., Ti, Zr, or Hf, a Group V-B metal, e.g., V, Nb, or Ta, a Group VIB metal, e.g., Cr, Mo, or W, or a Group VIII "Iron Triad" metal, Fe, Co, or Ni. Especially preferred non-electrode materials are Fe, Ti, Ni, Zr, Ta, V, and Sn, and the oxides, hydroxides, borides, carbides, and nitrides thereof, as well as mixtures thereof. Such material may have hydrophobic coatings thereon. For example, such materials may have hydrophobic coatings on at least a portion thereof whereby to exhibit hydrophobic and non-hydrophobic zones.

Alternatively, the film, coating, or layer may be formed of a perfluorocarbon polymer as such or rendered suitably hydrophilic, i.e., by the addition of a mineral, as potassium titanate.

The non-electrode material is present in the porous film, coating, or layer as a particulate. The particles have a size range of from about 0.01 micron to about 300 microns, and preferably of from about 0.1 to 100 microns. The loading of particles is from about 0.01 to about 30 milligrams per square centimeter, and preferably from about 0.1 to about 15 milligrams per square centimeter.

The porous film, coating or layer has a porosity of from about 10 percent to 99 percent, preferably from about 25 to 95 percent, and in a particularly preferred exemplification from about 40 to 90 percent.

The porous film, coating or layer is from about 0.01 to about 200 microns thick, preferably from about 0.1 to about 100 microns thick, and in a particularly preferred embodiment, from about 1 to 50 microns thick.

When the particles are not directly bonded to and embedded in the permionic membrane a binder is used to provide adhesion. The binder may be a fluorocarbon polymer, preferably a perfluorocarbon polymer, as polytetrafluoroethylene, polyhexafluoropropylene, or a perfluoroalkoxy, or a copolymer thereof with an olefinically unsaturated perfluorinated acid, e.g., having sulfonic or carboxylic functionality.

In an electrolytic cell environment where perfluorinated polymers are not required, the binder may be a hydrocarbon polymer such as a polymer or copolymer of ethylene, propylene, butylene, butadiene, styrene, divinylbenzene, acrylonitrile, or the like. Other polymeric materials such as polyethers, polyesters, polyamides, polyurethanes, polycarbonates, and the like may be employed. Such polymeric binding agents may also have acidic or basic functionality.

The electrodes (3), (11), bear upon the porous, non-electrode surface.

Alternatively, the solid electrolyte may be provided by a polymeric matrix having crown ethers grafted thereto and metal ions chelated to the crown ethers as described in the commonly assigned, copending application of J. D. Mansell for *Electro Organic Method And Apparatus For Carrying Out Same*, filed on even date herewith. Thus, the permionic membrane may be a polymeric matrix having a low degree of cross-linking and a glass transition temperature at least about 20 degees Centigrade below the intended temperature of the electrolyte and/or the reaction medium. Exemplary are polyolefins, polyethers, polyesters, polyamides, polyurethanes, polyphenol formaldehydes, and other polymers stable to cell conditions. The crown ether bonded thereto is chosen from the group consisting of cyclic polymers of ethylene oxide having from 4 to 6 ($CH_2CH_2O$) units, e.g., 12-crown-4, 15-crown-5, 18-crown-6, and dicyclohexano and dibenzo derivatives thereof.

Exemplary chelated metals are alkali metals such as sodium potassium, and lithium.

Especially desirable results are obtained where the crown ether is about 1 to about 50 weight percent of the permionic membrane, basis weight of polymeric matrix and crown ether. Thus, as herein contemplated, electrolysis may be carried out in an electrolytic cell having an anode, cathode, and a permionic membrane therebetween, by externally imposing an electrical potential across the electrolytic cell whereby to cause an ionic current to flow from the anode through the permionic membrane to the cathode, the permionic membrane being an anion selective permionic membrane comprising the above-described polymeric matrix having crown ethers grafted thereto.

Various electrode structures may be utilized herein. For example, the electrode may be adhered to the solid electrolyte, as a film, coating, or layer thereon, either with or without hydrophilic or hydrophobic additives. Alternatively, the electrodes may be on separate catalyst carriers which removably bear on the solid electrolyte. Suitable electrocatalyst materials depend upon the particular reaction to be catalyzed, and may typically include transition metals, oxides of transition metals, semi-conductors, and oxygen deficient crystalline materials. Alternatively, such materials as transition metals having "d" subshell or orbital activity may be utilized, e.g., iron, cobalt, nickel, and the platinum group metals.

According to a still further exemplification of this invention, the electrode, i.e., the electrocatalyst in contact with the ion selective solid electrolyte may be chemically bonded thereto, e.g., by polydentate ligands. Thus, the solid electrolyte may have ion selective groups, e.g., cation or anion selective groups as well as having, e.g., carboxyl linkages to transition metal ions.

Various reactions may be carried out according to the method of this invention. For example, organic compounds may be reduced at the cathode or oxidized at the anode.

Exemplary cathodic reactions include forming compounds chosen from the group consisting of aniline, p-aminophenol, and mixtures thereof by providing nitrobenzene and a source of hydrogen at the cathode and passing an electrical current from the anode to the cathode whereby to form aniline, p-aminophenol, or the like at the cathode as described in the aforementioned application of M. Korach.

Likewise, hydrogen peroxide may be produced by the electrolytic reduction of 2-alkyl anthraquinone or tetrahydro 2-alkylanthraquinone at the cathode followed by oxidation of the reduced alkylanthraquinone in the anolyte compartment of the cell or external to the cell or external to the cell as described in the aforementioned application of M. Korach. The electrolytic reduction at the cathode may be combined with simultaneous oxidation at the anode of aqueous sulfate to persulfate.

According to a still further exemplification of the invention herein contemplated, described in the aforementioned application of M. Korach, 1,4 -naphthoquinone may be produced by cathodic reduction of alphanitronaphthalene and the simultaneous or subsequent electrolytic oxidation of 1-naphthylamine formed thereby, whereby to obtain 1,4-naphthoquinone. Alternatively, the cathodic reduction can take place in the presence of sulfuric acid whereby to form 4-amino-1-naphthol. According to this exemplification alpha nitronaphthalene is provided in the catholyte whereby to form 4-amino-1-naphthol. The 4-amino-1-naphthol may then be hydrolyzed to form 1,4-dihydroxynapthalene which, in turn, may be oxidized either externally to the cell or at the anode of the electrolytic cell to form the 1,4-naphthoquinone. According to a further embodiment of this exemplification, the oxidation of the naphthol or 1,4-dihydroxynaphthalene can take place in a two phase system comprising an organic phase and an aqueous phase comprising a mineral acid.

According to a still further exemplification of the method of this invention where cathodic reduction occurs, an alkali metal chloride e.g., sodium chloride or potassium chloride, may be electrolyzed in an electrolytic cell having an anode, cathode, and an ion permeable separator therebetween, which method comprises passing an electrical current from the anode to the cathode, evolving chlorine at the anode, and evolving hydroxyl ion at the cathode, where the improvement resides in feeding a reducible organic compound to the cathode and forming a reduction product thereof, the reducible organic compound and reduction product thereof both being resistant to aqueous alkali metal hydroxide. Thus, according to one embodiment of this exemplification, the reducible organic compound is nitrobenzene and the reduction product is aniline. According to a still further embodiment of this exemplification, the reducible organic compound is water insoluble and the aqueous alkali metal hydroxide and the reducible organic compound are maintained in an agitated two-phase system.

According to a further exemplification of this invention where cathodic reduction occurs, described in the commonly assigned, copending application of M. Korach and S. R. Pickens for *Electro Organic Method And Apparatus For Carrying Out Same*, filed on even date herewith, a carboxylic acid is formed in the aforementioned electrolytic cell having an anode, a cathode, and the herein contemplated solid electrolyte therebetween by providing gaseous carbon dioxide and a reducible organic compound in contact with the cathode, and passing an electrical current from the anode to the cathode whereby to evolve a carboxylic acid at the cathode. The reducible organic compound is chosen from the group consisting of olefins, e.g., $C_2$ to $C_{30}$ olefins, alcohols, e.g., $C_2$ to $C_{20}$ alcohols, and alkyl halides, especially $C_1$ to $C_{10}$ alkyl bromides and iodides.

Alternatively, the apparatus and method of this invention may be utilized for anodic oxidations, e.g., an organic nitrile may be produced in an electrolytic cell having an anode, a cathode, and a solid electrolyte therebetween, by providing hydrogen cyanide and an oxidizable organic compound at the anode, and passing an electrical current from the anode through the solid electrolyte to the cathode whereby to form the organonitrile as described in the aforementioned application of M. Korach. Typically the oxidizable organic compound may be an olefin or alkyl halide and the nitrile may be an unsaturated or a saturated nitrile.

According to a further exemplification of this invention where anodic oxidation is carried out, saturated hydrocarbons may be oxidized in an electrolytic cell having an anode, a cathode, and an anion selective solid electrolyte therebetween, by passing an electrical current from the anode through the solid electrolyte to the cathode, evolving hydroxide ions at the cathode, and forming an oxidation product at the anode as described in the commonly assigned, copending application of N. R. DeLue for *Electro Organic Method And Apparatus For Carrying Out Same*, filed on even date herewith. For example, the oxidation product may be an alcohol, a carbonate, an alkyl oxide, a ketone, an aldehyde, a carboxylic acid or an oxidatively coupled hydrocarbon, and mixtures thereof.

We claim:

1. In a method of electrolyzing a non-aqueous medium in an electrolytic cell having an anode, a cathode, and solid electrolyte means, the anode in contact with one surface of the solid electrolyte means, the cathode in contact with the opposite surface of the solid electrolyte means, and the anode-solid electrolyte means-cathode dividing the electrolytic cell into anode and cathode compartments, which method comprises providing a non-aqueous medium containing an organic reactant in contact with one of said anode and cathode, and externally imposing an electrical potential across the anode and cathode whereby to evolve anhydrous product at an electrode and transport ionic species across the solid electrolyte means, the improvement wherein said solid electrolyte means contains entrapped, mobile, ion transport means provided by an ionizable liquid or polar ionic organic moieties within the solid electrolyte means.

2. In a method of electrolyzing a non-aqueous medium in an electrolytic cell having an anode, a cathode, and solid electrolyte means, the anode in contact with one surface of the solid electrolyte means, and the cathode in contact with the opposite surface of the solid electrolyte means, which method comprises providing a non-aqueous medium containing an organic reactant in contact with one of said anode and cathode, and externally imposing an electrical potential across the anode and cathode whereby to evolve anhydrous product at an electrode and transport ionic species across the solid electrolyte means, the improvement wherein said solid electrolyte means contains entrapped, mobile, ion transport means provided by an ionizable liquid or polar ionic organic moieties within the solid electrolyte means, the ionizable liquid being an aqueous electrolyte, and the electrolytic cell comprises a compartment between elements of the solid electrolyte which compartment contains the aqueous electrolyte.

3. In a method of electrolyzing a non-aqueous medium in an electrolytic cell having an anode, a cathode, and solid electrolyte means, the anode in contact with one surface of the solid electrolyte means, and the cathode in contact with the opposite surface of the solid electrolyte means, which method comprises providing a non-aqueous medium containing an organic reactant in contact with one of said anode and cathode, and externally imposing an electrical potential across the anode and cathode whereby to evolve anhydrous product at an electrode and transport ionic species across the solid electrolyte means, the improvement wherein said solid electrolyte means contains entrapped, mobile, ion transport means provided by an ionizable liquid or polar ionic organic moieties within the solid electrolyte means, the ionizable liquid being an aqueous electrolyte and the solid electrolyte means comprises two sheets of ion exchange resin material having a zone containing the aqueous electrolyte therebetween.

4. The method of claim 3 wherein a sheet of ion exchange resin material has a hydrophobic layer thereon whereby to retain the aqueous electrolyte within the solid electrolyte means.

5. In a method of electrolyzing a non-aqueous medium in an electrolytic cell having an anode, a cathode, and solid electrolyte means, the anode in contact with one surface of the solid electrolyte means, and the cathode in contact with the opposite surface of the solid electrolyte means, which method comprises providing a non-aqueous medium containing an organic reactant in contact with one of said anode and cathode, and externally imposing an electrical potential across the anode and cathode whereby to evolve anhydrous product at an electrode and transport ionic species across the solid electrolyte means, the improvement wherein said solid electrolyte means contains entrapped, mobile, ion transport means provided by an ionizable liquid or polar ionic organic moieties within the solid electrolyte means, and the ionizable liquid comprises an oxidation and reduction resistant, organic compound.

* * * * *